(12) United States Patent
Quek

(10) Patent No.: US 6,906,325 B2
(45) Date of Patent: Jun. 14, 2005

(54) PHOTO-RECEIVER ARRANGEMENT

(75) Inventor: Irene Quek, Carissa Park (SG)

(73) Assignee: Agilent Technologies, Inc., Palo Alto, CA (US)

( * ) Notice: Subject to any disclaimer, the term of this patent is extended or adjusted under 35 U.S.C. 154(b) by 144 days.

(21) Appl. No.: 10/305,672

(22) Filed: Nov. 26, 2002

(65) Prior Publication Data

US 2003/0111604 A1 Jun. 19, 2003

(30) Foreign Application Priority Data

Dec. 14, 2001 (SG) .......................................... 200107518

(51) Int. Cl.$^7$ ................................................ G01J 5/10
(52) U.S. Cl. .................................................. 250/338.1
(58) Field of Search ..................................... 250/338.1

(56) References Cited

U.S. PATENT DOCUMENTS

| | | | | | |
|---|---|---|---|---|---|
| 4,933,563 A | * | 6/1990 | Thus | ...................... | 250/370.01 |
| 5,600,128 A | * | 2/1997 | Lindstrom | ........... | 250/214 AG |
| 5,754,072 A | * | 5/1998 | Mazzetti | ...................... | 327/291 |
| 5,898,906 A | * | 4/1999 | Williams | ...................... | 455/75 |
| 6,064,268 A | * | 5/2000 | Felps | .......................... | 330/288 |
| 6,266,591 B1 | * | 7/2001 | Wilson-Jones et al. | ....... | 701/41 |
| 6,307,405 B2 | * | 10/2001 | Forbes et al. | ................. | 327/54 |
| 6,307,660 B1 | * | 10/2001 | Cordell et al. | .............. | 398/209 |
| 6,329,870 B1 | * | 12/2001 | Dedic | .......................... | 327/538 |
| 6,330,091 B1 | * | 12/2001 | Escobosa et al. | ........... | 398/112 |

* cited by examiner

Primary Examiner—David Porta
Assistant Examiner—Marcus Taningco

(57) ABSTRACT

A photo-receiver arrangement includes a photo-sensor that captures light being incident thereon within a predetermined range of light intensity values. The photo-sensor also converts the captured incident light into a first electrical signal. A pre-scaler is connected to an output of the photo-sensor for producing a second scaled electrical signal based on and corresponding to said first electrical signal input into the pre-scaler; and a preamplifier is connected to an output of the pre-scaler for amplifying said second scaled electrical signal input into the preamplifier. The preamplifier has a dynamic range of at least substantially linear gain. The pre-scaler and the preamplifier are designed in a mutually matching configuration such that the second scaled electrical signal falls within the said dynamic range of the preamplifier for any light intensity value falling into said predetermined range of light intensity values.

11 Claims, 4 Drawing Sheets

PHOTO-RECEIVER ARRANGEMENT

FIELD OF THE INVENTION

The invention relates to a photo-receiver arrangement having a photo-sensor and a preamplifier for detecting and measuring light, in particular infrared light being incident on the photo sensor.

BACKGROUND OF THE INVENTION

Infrared (IR) technology is one kind of wireless technology that is commonly utilized in electronic devices, like laptop computers, hand phones and PDAs (personal digital assistant) due to its low cost of implementation and high data transfer rates in the order of Mb/s. IR technology allows users to link to each other through various IR devices over a short distance. Generally, known IR devices comprise an IR transceiver for transmitting, receiving and processing an infrared signal. The IR transceiver including an IR sensor for capturing IR light and converting the same into an electrical signal, and a preamplifier for amplifying the electrical signal generated by the IR sensor. The power of the incident infrared light varies in orders of magnitude, depending on the distance between the source of the infrared signal, which can be e.g. a transceiver of another IR device or a remote control unit, and the sensor of the IR transceiver. As the distance increases, the infrared signal received by the sensor of the IR receiver decreases in an exponential manner. Furthermore, IR devices usually operate in conditions where there is ambient light. Such ambient light will reduce the Signal-to-Noise Ratio (SNR), and the sensor of the IR transceiver must still be able to detect the desired infrared signal despite the overwhelming photocurrent generated by the sensor corresponding to ambient light.

When the IR sensor captures an infrared signal, it generates a photocurrent, which is proportional to the signal strength. The photocurrent generated by the IR sensor needs to be amplified, and a transimpedance amplifier is used as the preamplifier. The transimpedance amplifier used in said known preamplifier is desired to be a low noise amplifier and should provide for a high gain. However, when using IR devices in the abovementioned reasonable range of distances, the intensity of the incident infrared light captured by the IR sensor varies typically in a dynamic range of about 100 dB (3.6 µW/SR to 500 mW/SR). Therefore, the intensity of the photocurrent generated by the IR sensor in response to the incident IR light and input to the preamplifier has also a dynamic range in the order of 100 dB. In contradistinction, the dynamic range of a typical transimpedance amplifier is only between 40 dB to 60 dB, beyond which the amplifier loses its linear properties and enters into saturation. As such, the transimpedance amplifier is not able to accommodate the wide dynamic range of the photocurrent generated by the IR sensor without losing its linearity.

A typical implementation of the receiver part of a known IR transceiver is shown in FIG. 1. The IR receiver comprising an IR sensor 100 including a photodiode 130, and a preamplifier is shown in FIG. 1. The preamplifier is implemented by a transimpedance amplifier 200 having an operational amplifier 210, a feedback resistor $R_f$ 220 and a feedback capacitor $C_f$ 230.

There are many constraints in designing the transimpedance amplifier 200 of this IR receiver. The lower bound of the dynamic range of the transimpedance amplifier 200 is determined by the level of the input referred noise of the transimpedance amplifier 200. Any signal with a signal level below the lower bound of the dynamic range will be very difficult to detect, as the SNR is very low in this range. The upper bound of the dynamic range of the transimpedance amplifier 200 is determined at the input signal level when the transimpedance amplifier 200 becomes saturated and the gain is no longer linear. Hence the dynamic range in which the transimpedance amplifier 200 should be operated must be between the upper and the lower bound so that on the one hand a low level input signal can be detected, and on the other hand a high level input signal is still amplified with a linear gain.

Further, the bandwidth requirement places a large constraint on the design of the transimpedance amplifier 200. The bandwidth of the transimpedance amplifier is approximated by $$BW \approx 1/(2\pi C_f R_f),$$

where $R_f$ is the feedback resistor 220 connected between the inverting input and the output of the operational amplifier 210 and $C_f$ is the feedback capacitor 230 connected in parallel with the feedback resistor 220.

The desired operational bandwidth should not be too narrow so as to avoid distortions such as intersymbol interferences, jitters, etc. On the other hand, the bandwidth should not be too wide, either, as a wide bandwidth would reduce the SNR. Therefore, the values of $C_f$ 230 and $R_f$ 220 should be carefully chosen to obtain an optimal operational bandwidth. However, this is not so easy as the values of $C_f$ 230 and $R_f$ 220 themselves are also subject to various constraints.

The photodiode 130 of the IR sensor 100 is desired to have a large surface area and thereby a large sensing area in order to achieve a high signal strength resulting in a good SNR. However, a large photodiode will inevitably introduce a high parasitic capacitance $C_{pd}$ 110 (also known as the pin capacitance) as the parasitic capacitance 110 is directly proportional to the size of the photodiode 130. Depending on the bias condition of the transimpedance amplifier 200, the $C_{pd}$ 110 can be as high as 10 pF to 15 pF. With such a high $C_{pd}$ 110, the circuit might have stability problems. In addition, the feedback capacitor $C_f$ 230 needs to be designed as large as possible to ensure stability of the transimpedance amplifier 200. However, increasing the value of the feedback capacitor $C_f$ 230 also decreases the bandwidth, resulting in increased distortion of the input signal.

Furthermore, the gain of the transimpedance amplifier 200 is directly proportional to the value of the feedback resistor $R_f$ 220. The value of $R_f$ 220 should be high on the one hand to achieve a high gain, but should not be too high on the other hand to avoid saturating the transimpedance amplifier 200 and narrowing its bandwidth. Reducing the value of the feedback resistor $R_f$ 220 will reduce gain and inevitably increase the bandwidth of the transimpedance amplifier 200, resulting in reduction of the SNR. This poses another constraint on the value of the feedback resistor $R_f$ 220.

As can be seen from above explanations, requirements regarding the sensitivity, dynamic range, Signal-to-Noise Ratio (SNR), bandwidth and stability of the IR receiver, and especially of its transimpedance amplifier, all pose constraints in designing the amplifier 200, and, therefore, many compromises have to be made.

One known implementation of a transimpedance amplifier is shown in FIG. 2 and uses an AGC (automatic gain control) unit 300 to vary the value of the feedback resistor $R_f$ 220' so as to avoid saturation of the transimpedance amplifier 200 by scaling the input photocurrent 120 generated by the IR sensor 100 to a range within 40 dB to 60 dB. One problem of this implementation is that since the dynamic range of the input photocurrent is very large as explained above, a feedback resistor $R_f$ 220' with a plurality of different values is needed to achieve a sufficient number of gain steps. Another problem is that this known implementation operates with high current values and has, therefore, high power dissipation.

Another known implementation of a preamplifier of an IR receiver is a diode clamping transimpedance circuitry 400 as shown in FIG. 3. The transimpedance circuitry 400 comprises a clamping diode 410 and a resistor 420 connected parallel to the clamping diode 410. The bandwidth of this diode clamping transimpedance circuitry 400 is approximated as $$BW \cong 1/(2\pi C_{pd} R)$$

wherein $C_{pd}$ is the parasitic capacitor 110 of the photosensor 100 and R 420 is the transimpedance when the input current is low. One drawback of this known diode clamping transimpedance circuitry 400 is that it is only suitable for low speed implementations. Furthermore, there is no control over the gain of the preamplifier 200.

SUMMARY OF INVENTION

One of the features of the invention is to provide a photo-receiver arrangement capable of capturing and processing incident light having a large dynamic range in an accurate manner.

Another feature of the present invention is to provide a photo-receiver arrangement that is less susceptible to the problems based on the constraints in sensitivity, SNR, bandwidth and stability of the known devices, and that has a low power dissipation being necessary for battery operated portable electronic devices like hand phones, personal digital assistants (PDA), laptops, etc.

A photo-receiver arrangement includes a photo-sensor that captures light being incident thereon and having a predetermined range of light intensity values, and that converts the captured incident light into a first electrical signal. A pre-scaler is connected to an output of the photosensor for producing a second scaled electrical signal based on and corresponding to the first electrical signal which is input into the pre-scaler. A preamplifier is connected to an output of the pre-scaler to amplify the second scaled electrical signal which is input into the preamplifier. The preamplifier has a dynamic range of at least substantially linear gain. The pre-scaler and the preamplifier are designed in a mutually matching configuration such that the second scaled electrical signal falls within the dynamic range of the preamplifier for any light intensity value falling into said predetermined range of light intensity values.

DETAILED DESCRIPTION OF THE INVENTION

Figure 1:
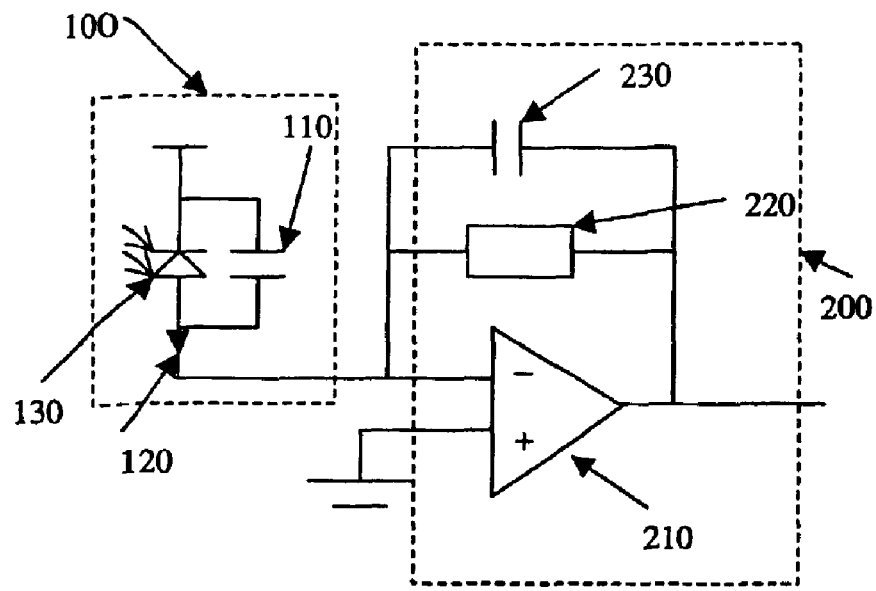
FIG. 1 shows a schematic circuit diagram of a prior art photo-receiver with a transimpedance amplifier.
Figure 2:
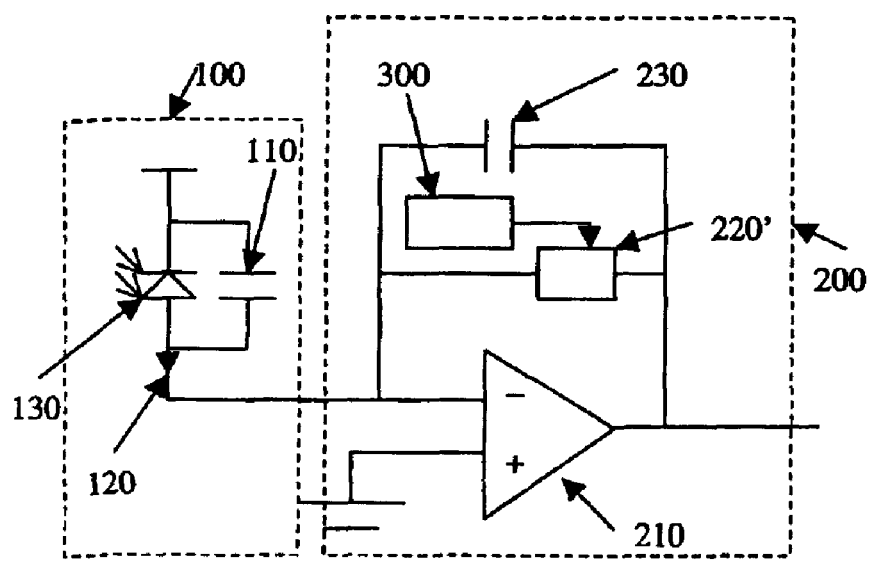
FIG. 2 shows a schematic circuit diagram of a prior art photo-receiver with transimpedance amplifier comprising an automatic gain control unit.
Figure 3:
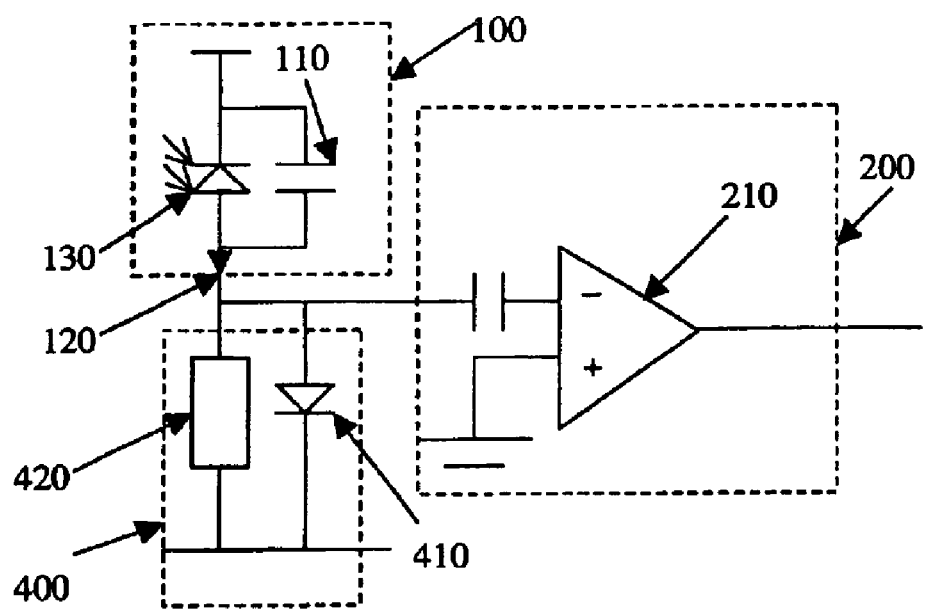
FIG. 3 shows a schematic circuit diagram of a prior art photo-receiver using a diode clamping transimpedance circuitry.
Figure 4:
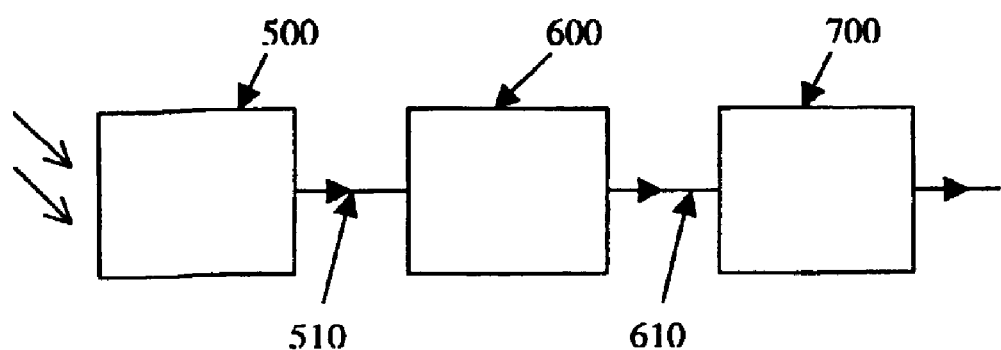
FIG. 4 shows a block diagram of the photo-receiver arrangement according to the invention.

FIG. 4 shows a photo-receiver arrangement that includes a photo-sensor 500, a pre-scaler 600 and a preamplifier 700. The photo-sensor 500 captures light being incident thereon and having a predetermined range of light intensity values, and converts the captured incident light into a first electrical signal. The pre-scaler 600 is connected to an output of the photo-sensor for producing a second scaled electrical signal based on and corresponding to the first electrical signal which is input into the pre-scaler 600. The preamplifier 700 is connected to an output of the pre-scaler 600 to amplify the second scaled electrical signal which is input into the preamplifier 700. The preamplifier 700 has a dynamic range of at least substantially linear gain. The pre-scaler 600 and the preamplifier 700 are designed in a mutually matching configuration such that the second scaled electrical signal falls within the dynamic range of the preamplifier 700 for any light intensity value falling into said predetermined range of light intensity values.

According to another embodiment of the invention, the pre-scaler 600 scales the electrical signal generated by the photo-sensor 500 in response to the incident light such as to produce a scaled electrical signal with a value which falls within the preamplifier's dynamic range with linear gain characteristics and which unambiguously and distinctively corresponds to the respective value of the electrical signal generated by the photo-sensor 500. In other words, the input light of a large dynamic range is converted in total by the photo-sensor 500 and the pre-scaler 600 to a scaled electrical signal with a dynamic range corresponding to the linear gain dynamic range of the preamplifier 700. Accordingly, the pre-scaler 600 performs the signal scaling in such a manner that for every light intensity value of the incident light a scaled electrical signal being specific for and assigned to that light intensity value of the incident light is produced so that no signal information is lost during the scaling. In this context, specific scaled electrical signal means a scaled electrical signal with a specific signal value or, if a pre-scaler with a variable scaling factor is used, a scaled electrical signal with a specific combination of a signal value and a scaling factor used to produce the scaled electrical signal with that signal value. This allows the characteristics of the scaling (e.g., the extent of the scaling and the gain of the preamplifier) to be set independently from each other. This means that it is not necessary to vary a feedback resistor of the preamplifier 700 in order to scale the electrical signal input to the preamplifier 700. Rather, the feedback resistor can be fully used to adjust the gain of the preamplifier without having to consider the large dynamic range of the input electrical signal, and the feedback capacitor can be fully used to adjust the bandwidth of the preamplifier 700 without having to consider the large parasitic capacitance of the photo sensor 500 with regard to the question of stability of the circuit.

Furthermore, since the photo-sensor 500 and the preamplifier 700 are separated and isolated from each other by the pre-scaler 600, the photo-sensor 500 does not have any direct influence on the bandwidth, the Signal-to-Noise Ratio and the stability of the preamplifier 700. Also, by introducing the pre-scaler 600, the pre-scaler 600 can be designed so that the effect of the photo-sensor 500 on the preamplifier 700 with regard to its bandwidth, SNR and stability is compensated by that of the pre-scaler 600 so that the photo-sensor 500 and the pre-scaler 600 jointly as a unit seen by the input of the preamplifier 700 do not have any negative effect on the mentioned characteristics of the preamplifier 700.

The photo-receiver arrangement according to the invention can be used for detecting and processing any kind of light signal which has a wide dynamic range regarding its intensity. In addition, the photo-receiver arrangement according to the invention can be utilized very advantageously for detecting and processing infrared light, since infrared light has a very wide signal intensity range. Therefore, according to a preferred embodiment of the invention, the photo-sensor is an infrared sensor and the photocurrent generated by the infrared sensor as output electrical signal corresponds to the signal power of the infrared light which is detected by the infrared sensor.

The pre-scaler 600 of the photo-receiver arrangement according to the invention can be any circuitry which varies the value of its input current supplied by the photo-sensor 500 so as to match it with the operational linear gain dynamic range of the preamplifier 700. It can be implemented, for example, by current modifying circuits.

According to the invention, the pre-scaler 600 can be implemented such that it performs a scaling operation with a variable scaling value. Moreover, according to a preferred embodiment of the invention, the pre-scaler 600 is designed to perform a variable scaling of the electrical signal generated by the photo-sensor 500 with a set of discrete scaling factors. In this embodiment of the invention the scaling factor to be used for a specific signal value of the electrical signal generated by the photo-sensor 500 is preferably determined by that signal value of the electrical signal itself.

According to a further preferred embodiment of the invention, the pre-scaler 600 is a programmable current mirror coupled with a current sensing circuit. The photocurrent produced by the photo-sensor is input into the current mirror and a current being proportional to the photocurrent is drawn from the current sensing circuit. Based on the current drawn, the current sensing circuit determines the level of the photocurrent and thereby a scaling factor to be applied to the photocurrent, and produces a corresponding control signal input into the current mirror to scale the photocurrent according to the determined scaling factor. The scaled current, which is kept within the dynamic range of the preamplifier, is then supplied to the preamplifier as input signal.

According to a preferred embodiment of the invention, the preamplifier 700 is a transimpedance amplifier which amplifies the scaled input current to an output voltage. In this case, a feedback resistor and a feedback capacitor are connected between the input and the output of the transimpedance amplifier. The feedback resistor is used to control the gain of the transimpedance amplifier, and the capacitor, together with the resistor, is used to control the bandwidth of the amplifier. Choice of the resistor and capacitor values is not restricted by the large parasitic capacitance Cpd of the photo sensor 500 since the parasitic capacitance does not threaten the stability of the circuit. As the input current of the preamplifier is prevented from being too high by the pre-scaler 600 according to the invention, the power consumption and dissipation of the preamplifier is small so that the photo-receiver according to the invention can be advantageously utilized as infrared receiver for portable electrical devices having infrared communication units for infrared data transfer.

As can be seen from FIG. 4, when light falls on and is captured by the sensor 500, a photocurrent $I_{pd}$ 510 is generated by the sensor, wherein the value of the generated photocurrent is proportional to the intensity of the light received by the sensor 500. The pre-scaler 600 receives the generated photocurrent $I_{pd}$ 510 as input signal and scales the value of the photocurrent $I_{pd}$ 510, thereby generating an input current $I_{in}$ 610 to be fed into the preamplifier 700. After scaling by the pre-scaler, the value of the input current $I_{in}$ is such that it falls within the operational, linear gain dynamic range of the preamplifier 700. The preamplifier 700 amplifies the input current $I_{in}$ 610 to produce a suitable output signal.

Figure 5:
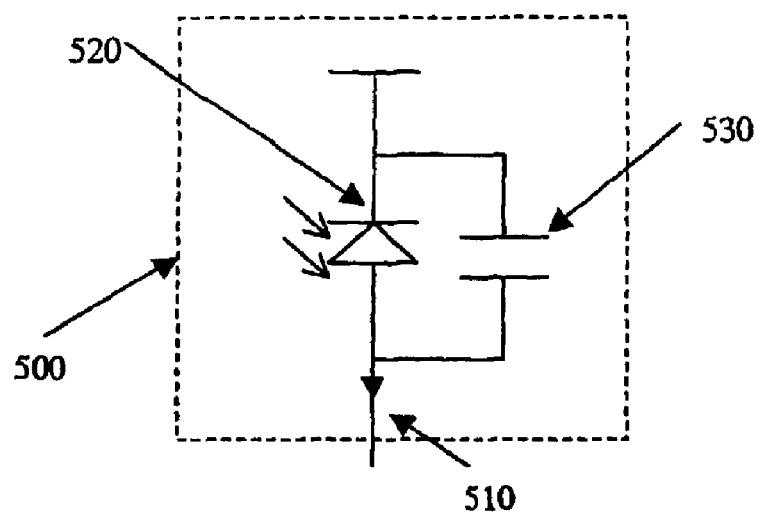
FIG. 5 shows a schematic circuit diagram of the photosensor of the photo-receiver arrangement according to a preferred embodiment of the invention.

According to the preferred embodiment of the invention, the photo-sensor 500 is an infrared (IR) sensor which detects any IR signal being incident thereon and produces a corresponding photocurrent $I_{pd}$ 510. The IR sensor 500 comprises a photodiode 520 with a parasitic capacitance $C_{pd}$ 530 connected in parallel with the photodiode 520 as shown in FIG. 5. The photocurrent $I_{pd}$ 510 is fed into the pre-scaler 600.

Figure 6:
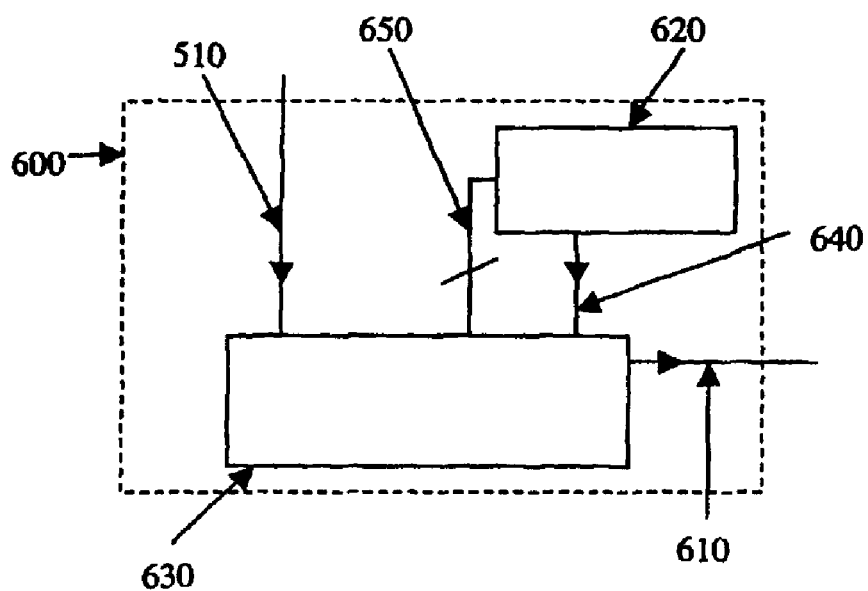
FIG. 6 shows a schematic circuit diagram of the pre-scaler of the photo-receiver arrangement according to the preferred embodiment of the invention.

The main purpose of the pre-scaler 600 is to have an independent scaling function to scale the photocurrent $I_{pd}$ 510 to an input current $I_{in}$ 610 which is within the linear gain dynamic range of the preamplifier 700. According to the preferred embodiment of the invention, the pre-scaler 600 comprises a programmable current mirror 630 and a current sensing circuit 620 as shown in FIG. 6. The photocurrent $I_{pd}$ 510 output by the IR sensor 500 is fed directly into the programmable current mirror 630 and a corresponding sensing current $I_s$ 640 being proportional to the photocurrent $I_{pd}$ 510 is drawn from the current sensing circuit 620. Based on the sensing current $I_s$ 640 drawn, the sensing circuit 620 judges whether the value of the photocurrent $I_{pd}$ 510 is too high so that the preamplifier 700 would be saturated if the photocurrent $I_{pd}$ 510 were directly supplied to it, or the photocurrent $I_{pd}$ 510 is too small to produce a good Signal-to-Noise ratio (SNR). Based on this judgement a scaling factor m is determined by the current sensing circuit 620. The current sensing circuit 620 generates then a control signal 650 corresponding to the said scaling factor m and outputs the same to the programmable current mirror 630 which, in turn, scales the photocurrent $I_{pd}$ 510 according to the scaling factor m and thereby produces at its output the input current $I_{in}$ 610 to be input into the preamplifier 700.

Therefore, the input current $I_{in}$ 610 fed to the preamplifier 700 is either a multiple or a fraction of the photocurrent $I_{pd}$ 510 given by the following equation $$I_{in} = m \cdot I_{pd}$$

wherein $I_{in}$ 610 is a multiple of $I_{pd}$ 510 with m<1 when $I_{pd}$ 510 is at or above the higher bound of the operational linear gain dynamic range of the preamplifier 700, and m>1 when $I_{pd}$ 510 is at or below the lower bound of the said dynamic range to achieve good SNR.

Accordingly, the function of the current sensing circuit 620 is to determine the scaling factor m in order to scale the photocurrent $I_{pd}$ 510. In contradistinction, the current sensing circuit 620 does not have tight bandwidth, SNR and stability requirements. Moreover, the current sensing circuit 620 is also isolated from the preamplifier 700 and therefore the components used in the current sensing circuit 620 do not affect the performance of the preamplifier 700. As a result, the current sensing circuit 620 is easy to design and implement.

In the preferred embodiment of the invention the programmable current mirror 630 is a multi-stage current mirror which allows the photocurrent $I_{pd}$ 510 to be scaled up or down in steps according to the number of stages utilized. The current mirror can be implemented by using MOS or BJT transistors as basic electronic components.

Figure 7:
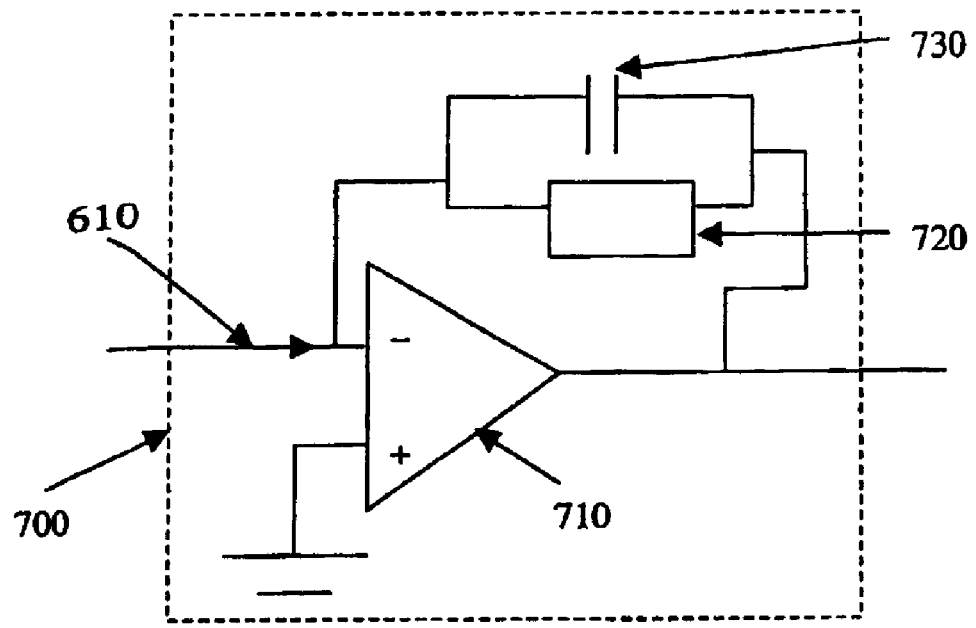
FIG. 7 shows a schematic circuit diagram of the preamplifier of the photo-receiver arrangement according to the preferred embodiment of the invention.

The preamplifier 700 amplifies the input current $I_{in}$ 610 to produce a suitable output signal. Depending on the implementation of the preamplifier 700, the output signal can be a current or a voltage signal. According to the preferred embodiment, the preamplifier 700 is implemented as a transimpedance amplifier comprising an operational amplifier 710 with a feedback resistor $R_f$ 720 and a feedback capacitor $C_f$ 730 as shown in FIG. 7. The resistor $R_f$ 720 can be made as a variable resistor to control the gain of the amplifier 710, and to set, together with the capacitor $C_f$ 730, the bandwidth of the preamplifier 700.

Since the pre-scaler 600 scales the photocurrent $I_{pd}$ 510, the dynamic range of the input current $I_{in}$ 610 produced by the pre-scaler 600 is reduced as well. Therefore, it is not necessary for the preamplifier 700 to utilize a variable feedback resistor to achieve a number of variable gain steps. Consequently, according to the preferred embodiment of the invention, the resistance of the resistor $R_f$ 720 can even be set to a fix value.

Figure 8:
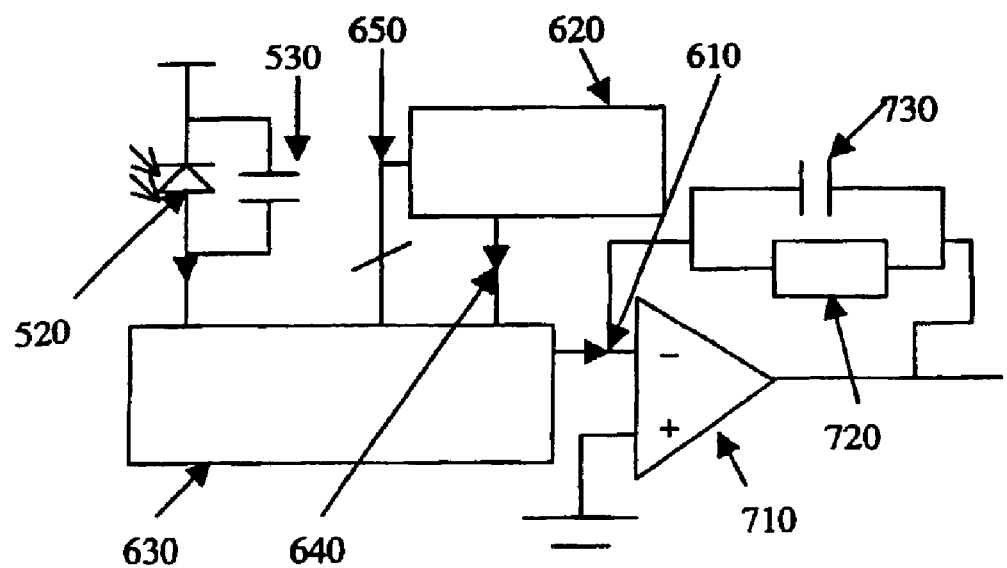
FIG. 8 shows a schematic circuit diagram of the photo-receiver arrangement according to the preferred embodiment of the invention.

FIG. 8 shows a schematic circuit diagram of the entire photo-receiver arrangement according to the preferred embodiment of the invention. Although the shown and described embodiment refers to a single-ended implementation of the photo-receiver arrangement according to the invention, it should be noted that the invention is not restricted thereto. Rather, it is within the scope of the invention to implement the photo-receiver arrangement in a differential or pseudo-differential configuration. The advantage of a single-ended configuration over a differential configuration is that it has much lower power consumption, which is an important aspect when the photo-receiver arrangement is utilized in a portable electronic device. However, a differential configuration has the advantage of a far better noise compensation. According to the invention a pseudo-differential configuration of the photo-receiver arrangement is preferred which is a compromise between the single-ended and differential configurations.

Referring further to FIG. 8, as the dynamic range of the input current $I_{in}$ 610 of the preamplifier 700 is reduced by the current mirror 630, the preamplifier 700 does not enter into saturation even in case of high infrared light intensity values and hence always gives a gain that is linear for all input signal values. Also, even if the photocurrent $I_{pd}$ 510 based on a low intensity infrared light is so small that it would lie below the lower bound of the linear gain dynamic range of the preamplifier 700, the input current $I_{in}$ 610 fed to the preamplifier 700 is within the said dynamic range since it is scaled up by the pre-scaler 600. Therefore the input current $I_{in}$ 610 will always be within the lower and upper bound of the linear gain dynamic range of the preamplifier 700 so as to give good SNR. As a result, the value of the feedback resistor $R_f$ 720 need not be restricted to prevent the preamplifier 700 from saturation or to give a good SNR. The problem of large power consumption and dissipation by the preamplifier 700 is also circumvented as the input current $I_{in}$ 610 is controlled from being too high.

In the photo-receiver arrangement according to the invention the parasitic capacitance $C_{pd}$ 530 is isolated from the preamplifier 700 by the pre-scaler 600, and hence does not affect the stability of the amplifier 700. Therefore, the photodiode 520 can be large-sized, thereby improving the sensitivity of the photo-sensor 500. Further, there is no constraint to set the value of the feedback capacitor $C_f$ 730 high in order to provide for a high stability of the preamplifier 700. Since the feedback resistor $R_f$ 720 and the feedback capacitor $C_f$ 730 are not restricted to certain values by bandwidth, stability and Signal-to-Noise Ration aspects, they can be set to values so as to obtain the desired gain and bandwidth for the preamplifier 700.

The photo-receiver arrangement according to the invention can be utilized in any kind of electrical devices, in particular in PDAs, handphones and laptops.

What is claimed is:

1. A photo-receiver arrangement, comprising a photo-sensor that captures light being incident thereon within a predetermined range of light intensity values, and converts the captured incident light into a first electrical signal;

a pre-scaler connected to the photo-sensor to produce a second scaled electrical signal based on and corresponding to said first electrical signal input into the pre-scaler, wherein the second scaled electrical signal is produced by the pre-scaler using a variable scaling factor which is dependent on the first electrical signal; and a preamplifier connected to an output of the pre-scaler to amplify the second scaled electrical signal input into the preamplifier, the preamplifier having a dynamic range of at least substantially linear gain;

wherein the pre-scaler and the preamplifier are designed in a mutually matching configuration such that the second scaled electrical signal falls within the said dynamic range of the preamplifier for any light intensity value falling into said predetermined range of light intensity values, and wherein the second scaled electrical signal is produced by the pre-scaler independently of the preamplifier.

2. The photo-receiver arrangement according to claim 1, wherein the photo-sensor is an infrared sensor, and the pre-scaler and the preamplifier are designed in matching relationship with the infrared sensor.

3. The photo-receiver arrangement according to claim 1, wherein the pre-scaler is designed such as to perform a scaling of said first electrical signal with a set of discrete scaling factors.

4. The photo-receiver arrangement according to claim 3, wherein the pre-scaler is designed such that its scaling factor is determined by said first electrical signal.

5. The photo-receiver arrangement according to claim 1, wherein the pre-scalar comprises a programmable current mirror.

6. The photo-receiver arrangement according to claim 5, wherein the pre-scaler comprises a current sensing circuit, the current sensing circuit being connected to said programmable current mirror for controlling the same.

7. The photo-receiver arrangement according to claim 6, wherein the current sensing circuit is an A/D converter.

8. The photo-receiver arrangement according to claim 5, wherein the programmable current mirror is implemented by MOS or BJT transistors.

9. The photo-receiver arrangement according to claim 1, wherein the preamplifier is a transimpedance amplifier comprising an operational amplifier, a feedback resistor and a feedback capacitor connected between the output and the negative input of the operational amplifier.

10. The photo-receiver arrangement according to claim 1, wherein the photo-sensor, the pro-scaler, and the preamplifier are designed in a single-ended configuration.

11. The photo-receiver arrangement according to claim 1, wherein the photo-sensor, the pre-scaler and the preamplifier are designed in a differential or pseudo differential configuration.

* * * * *